United States Patent Office 3,752,688
Patented Aug. 14, 1973

3,752,688
PROCESS FOR WET GRINDING OF PIGMENTS IN AQUEOUS ALKALINE MEDIUM
Otto Fuchs, Frankfurt am Main, Reinhold Deubel, Altenhain, Taunus, and Joachim Weide, Kelkheim, Taunus, Germany, assignors to Farbwerke Hoechst Aktiengesellschaft vormals Meister Lucius & Bruning, Frankfurt am Main, Germany
No Drawing. Filed Sept. 2, 1971, Ser. No. 177,517
Claims priority, application Germany, Sept. 4, 1970, P 30 43 820.4
Int. Cl. C08h 17/14
U.S. Cl. 106—309                    5 Claims

ABSTRACT OF THE DISCLOSURE

A process for the wet grinding of pigments which comprises effecting the grinding in an aqueous medium containing 0.1–20 percent of a base selected from the group of water soluble alkali metal-, alkali earth metal- or ammonium compounds. The addition of bases improves the transmission of grinding energy to the material being ground and results in the production of purer pigments of better tinctorial strength in a relatively short grinding time. Furthermore, the grinding process according to the invention is carried out in a simple and inexpensive way.

---

The tinctorial properties of pigments depend to a very large extent on their physical state or grade of dispersion. In the synthesis, the pigments are often obtained in big crystals and must be comminuted to a coloristically valuable grain size by an appropriate grinding device.

From German patent specification No. 1,137,156, it is known that pigments are finely divided in a ball mill by salt grinding with 4 to 10 parts of salt per part of pigment. This process is relatively expensive and furthermore involves an additional pollution of the waste water due to the resulting big salt amounts. Moreover, it is known how to grind pigments in an inert organic solvent. In this case, special grinding and drying devices are necessary due to the inflammability of the solvents. Also, this method is rather expensive because of the necessary regeneration of the solvents.

German patent specification No. 1,115,711, and Swiss patent specification No. 591,437, describe the fine division of pigments by precipitation from sulfuric acid and subsequent treatment with a solvent. This process cannot be applied to all pigments and also involves problems concerning waste water.

From Belgian patent specification it is known how to grind pigments in water by addition of big amounts of water-soluble dispersing agents. However, aqueous pigment preparations are obtained, which are only suitable for coloring paper, soaps and plastic dispersions, but which may not be used for coloring lacquers and plastics. For preparing pure powder pigment, these dispersing agents which are advantageous in the grinding process, would have to be eliminated again completely. Removal of the dispersing agents can be effected only to a limited extent and by a considerable effort.

It has now been found that pigments may be converted into a pigment form suitable for dyeing, if grinding is effected in the presence of an aqueous base. Suitable bases are preferably those which derive from the alkali metals or alkaline earth metals or from the ammonium ion such as for example sodium-, potassium-, barium hydroxide, sodium carbonate or ammonium hydroxide. The concentration of the base may range between 0.1% and 20%, preferably between 1% and 10%. For carrying out the process according to the invention, the pigments are ground with a large excess of the aqueous base. Preferably the amount of the aqueous base used is 3 to 5 times the amount by weight of the pigment. It is also possible to use a much bigger excess. The amount of aqueous base required, especially the lower limit thereof, depends on the viscosity of the respective pigment suspension and on the grinding devices used. Grinding is carried out in the presence of steel balls, the diameter of which is adjusted to the dimension of the mill, in a roller mill or in a continuously working vibration mill. Instead of steel balls, quartz granules or other grinding apparatuses may be used. However, if possible, the grinding devices should not be worn out too much by use, under the grinding conditions, and they should not be attacked by chemical products. It is advantageous to use grinding devices having a little diameter and, if possible, a high dead weight such as steel balls, since in this way the best grinding effect is obtained.

The grinding in an aqueous alkaline medium according to the invention may be applied to all pigments compatible with alkalis, for example to those of the following groups: thioindigo pigments, perylene tetracarboxylic acid pigments, dioxazine pigments, phthalocyanine pigments, quinacridones or azo pigments. After the pigments have reached the desired degree of fine division, the dyeing product is worked up as usual by filtration, washing and drying. If desired, the ground composition may be neutralized before filtration.

The pigment dyestuffs treated according to the process of the present invention are distinguished by a good tinctorial strength, brilliance and a high purity; they are suitable for coloring lacquers, varnishes, rubber or plastics. In contradistinction to the processes employed hitherto, the grinding of pigments in the presence of aqueous bases has the following advantages: Compared to grinding in an aqueous medium, the addition of bases improves the transmission of grinding energy to the material being ground and results in the production of purer pigments of better tinctorial strength in a relatively shorter grinding time. As concerns the devices, the grinding process according to the invention may be carried out in a simple and inexpensive way. The pollution of the waste water is also smaller. The process according to the invention also permits the use of steel balls, which are grinding devices having a high dead weight, without any danger of rusting.

The following examples illustrate the invention.

EXAMPLE 1

20 g. of 4,4′,7,7′-tetrachloro-thioindigo with 2 grams of sodium hydroxide in 80 ml. of water were ground for 48 hours in a 1 l. roller-mill, 60 percent by volume of which was filled with steel balls of a diameter of 9 mm. and which was operated with 70% of its critical number of revolutions. After separating the pigment paste from the grinding devices by means of water, the whole was adjusted to a slightly acidic reaction with diluted hydrochloric acid, suction-filtered, washed until neutral and dried in the air-drying device at 60–70° C. After pulverizing, a pigment was obtained, which, when coloring enamels, was distinguished by a high tinctorial strength, the purity of the shade, transparency and a good fastness to light. If the same 4,4′,7,7′-tetrachlorothioindigo dyestuff was ground under the same conditions without addition of sodium hydroxide, a pigment was obtained which, when coloring lacquers, was distinguished very intensely from the pigment according to the invention by a dark full shade, little purity and little color intensity.

If instead of sodium hydroxide 2 g. of potassium hydroxide, 4 g. of barium hydroxide or 4 g. of sodium hydroxide were used, a pigment was obtained which exhibited the same good properties.

Instead of using the above roller mill, grinding may also be effected in a continuously working high-energy vibration mill using steel balls having a diameter of from 1 to 3 mm., the grinding time being accordingly shorter.

EXAMPLE 2

20 g. of perylene-(3,4,9,10)-tetracarboxylic acid-bis-(3'5'-dimethyl-anilide) were ground for 60 hours with 6 g. of a 25% ammonium-hydroxide and 80 ml. of water in a 1 l. roller-mill, 60 percent by volume of which was filled with steel balls of a diameter of 9 mm. and which was operated with 70% of its critical number of revolutions. After separating the pigment paste from the grinding devices by means of water, the slurry was adjusted to slightly neutral by means of hydrochloric acid, suction-filtered, washed until neutral and dried at 60–70° C. in an air-drying device. After pulverizing, a red pigment was obtained which, when coloring enamels, was distinguished from the product ground under the same conditions, but without ammonia, by its higher tinctorial strength, the purity of the shade and the better transparency.

EXAMPLE 3

20 g. of Cu-phthalocyanine were roll-milled for 48 hours with 4 g. of potassium hydroxide and 80 ml. of water in a 1 l. roller-mill, 60 percent by volume of which was filled with steel balls of a diameter of 9 mm. and which was operated with 70% of its critical number of revolutions. After separating the pigment paste from the grinding devices with water, the slurry was adjusted to slightly acidic, suction-filtered, washed until neutral and dried at 60–70° C. in the air-drying device. After pulverizing, a blue pigment was obtained, which was distinguished from the Cu-phthalocyanine ground under the same conditions, but without potassium hydroxide, by a higher tinctorial strength, the purity of the shade and a better transparency.

EXAMPLE 4

20 g. of perylene-(3,4,9,10)-tetracarboxylic acid-bis-(4'-methoxy-anilide) were ground for 48 hours with 6 g. of sodium hydroxide and 80 ml. of water in a 1 l. roller-mill, 60 percent by volume of which was filled with steel balls of a diameter of 9 mm. and which was operated with 70% of its critical number of revolutions. After separating the pigment paste from the grinding devices with water, the slurry was adjusted to slightly acidic, suction-filtered, washed until neutral and dried at 60–70° C. in the air-drying device. After pulverizing a red pigment was obtained, which was distinguished from the pigment ground under the same conditions but without sodium hydroxide, by a better tinctorial strength, a much purer shade and a different transparency.

We claim:

1. A process for converting crude organic pigments into a form suitable for use in dyeing which comprises grinding an organic pigment selected from thioindigo, perylene tetracarboxylic acid, dioxazine, phthalocyanine, quinacridones and azo pigments in an aqueous medium containing 0.1 to 20% by weight of a base selected from the group consisting of water-soluble alkali metal, alkaline earth metal and ammonium hydroxides and alkali metal carbonates.

2. A process according to claim 1 wherein the amount of aqueous medium used is from 3 to 5 times the weight of said pigment.

3. A process according to claim 1 wherein said base is sodium hydroxide.

4. A process according to claim 1 wherein said base is potassium hydroxide.

5. A process according to claim 1 wherein said base is potassium hydroxide.

References Cited

UNITED STATES PATENTS

| | | | |
|---|---|---|---|
| 3,398,008 | 8/1968 | Jacobs et al. | 106—288 |
| 2,346,085 | 4/1944 | Sawyer | 106—309 |
| 3,313,492 | 4/1967 | Jacobs et al. | 106—309 |

DELBERT E. GANTZ, Primary Examiner

S. L. BERGER, Assistant Examiner

U.S. Cl. X.R.

106—288 Q